(No Model.)
J. McCABE.
FILTER.
No. 537,705. Patented Apr. 16, 1895.
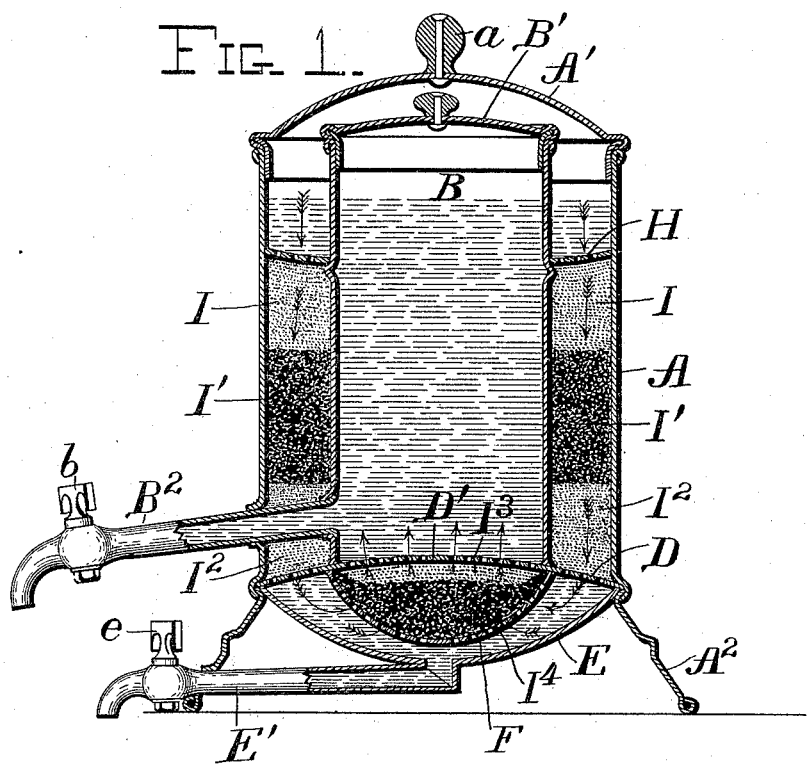
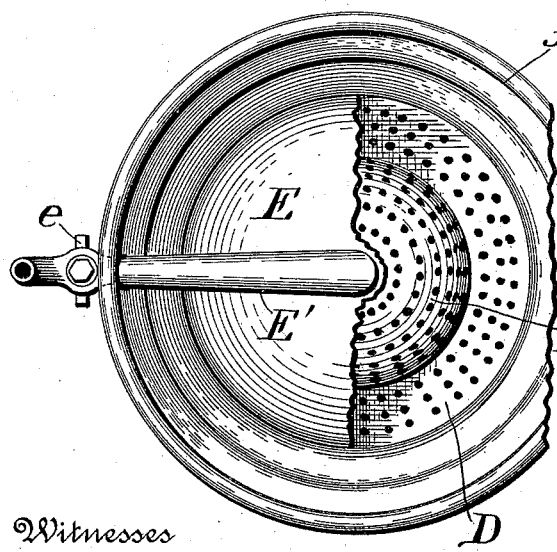
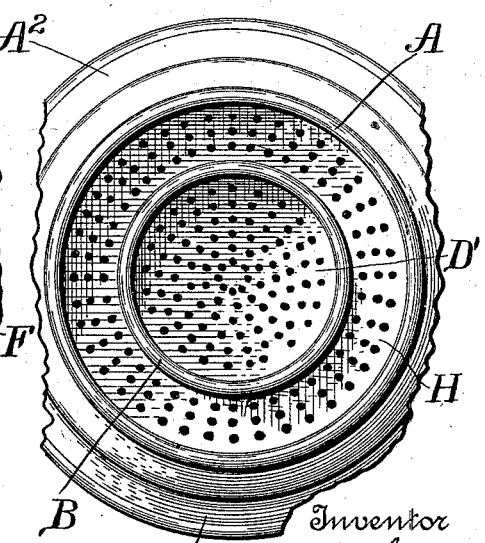
Witnesses
Percy C. Bowen
J. C. Wilson
Inventor
John McCabe,
By Whitman & Wilkinson,
Attorneys.

UNITED STATES PATENT OFFICE.

JOHN McCABE, OF NEW ORLEANS, LOUISIANA.

FILTER.

SPECIFICATION forming part of Letters Patent No. 537,705, dated April 16, 1895.

Application filed June 23, 1894. Serial No. 515,520. (No model.)

*To all whom it may concern:*

Be it known that I, JOHN MCCABE, a citizen of the United States, residing at New Orleans, in the parish of Orleans and State of Louisiana, have invented certain new and useful Improvements in Filters; and I do hereby declare the following to be a full, clear, and exact description of the invention, such as will enable others skilled in the art to which it appertains to make and use the same.

My invention relates to improvements in filters, and it consists of the certain novel construction, combination and arrangement of parts hereinafter described and claimed.

Reference is had to the accompanying drawings, in which the same parts are indicated by the same letters throughout the several views.

Figure 1 represents a central vertical section of my improved filter. Fig. 2 represents an inverted plan view of the same, part of the bottom being broken away; and Fig. 3 represents a plan view of the top of the filter after the cover has been removed.

A represents a cylindrical vessel provided with a cover A' with a knob $a$ for lifting said cover. This cylindrical vessel A is provided with a perforated bottom D, curved upward toward the center thereof, as at D'. Mounted on this perforated bottom, and concentric with the cylindrical vessel A, is an inner vessel B which is provided with a cover B', and has a spout $B^2$ projecting through the side of the inclosing vessel A, which spout is controlled by the cock $b$. Sliding between the outer vessel A and the inner vessel B, is a perforated ring H, beneath which and filling the annular space between the two vessels A and B, I provide any desired number of layers of filter material, I, I', and $I^2$, which filter material rests on the perforated bottom plate D. Beneath this perforated plate D a curved water-tight bottom E is provided, having a drain pipe E' and a drain cock $e$. Mounted in the chamber above this water-tight bottom, and between it and the curved perforated plate D, I provide a curved perforated plate F which is filled with one or more layers of suitable filter material $I^3$ and $I^4$. This filter material forms a filter bottom for the inner vessel B.

The filter material above the plate F is placed in position before the said plate is soldered on, and remains as a permanent part of the apparatus, while the filter material I, I', and $I^2$ may be removed as often as is desired.

The operation of the device is as follows: The apparatus being dry, and the inner vessel B being thoroughly clean, impure water is poured into the annular space over the perforated plate H. This water percolates downward through the filter material I, I', and $I^2$, and passing through the perforated plate D enters the chamber above the bottom E. Here the partly filtered water passes up through the perforated plate F, and through the filter material $I^4$ and $I^3$ into the inner vessel B, where it is found pure and well filtered. From this vessel it is drawn off by means of the cock $b$. Since the partly filtered water rises upward through the filter material above the curved perforated plate F, the impurities in the said water will be deposited on the lower side of the particles constituting the said filter material, whence they may be readily detached; and hence if when the vessel B is full of pure water, and the drain cock $e$ is opened, the downward rush of the pure water from the vessel B will wash out and carry away the impurities that have accumulated in the filter material $I^3$ and $I^4$, and thus thoroughly cleanse the same.

It will only be necessary to occasionally run a current of pure water downward through the vessel B and the filter material beneath the same, to effectually cleanse the latter and render the filter fit for further use.

The various parts of the herein described filter may be made of galvanized iron, tin, aluminium, or other suitable material; and the filter material itself may be of charcoal, gravel, sand, or any other well-known form of filter material.

Since water is a very poor conductor of heat, it will be obvious that if ice be placed in the vessel B, and the covers B' and A' be put in place, the herein described apparatus will be eminently adapted for use as a water cooler as well as a filter.

Having thus described my invention, what I claim, and desire to secure by Letters Patent of the United States, is—

1. A filter consisting of two concentric vessels with filter material placed in the space between the two; a filter bottom to the inner vessel clear of the bottom of the outer vessel; a drain cock adapted to drain off the liquid from the bottom of the outer vessel, and a spout to drain off the filtered liquid, connected to the inner vessel above the filter bottom thereof, substantially as and for the purposes described.

2. In a filter, the combination with the cylindrical vessel A provided with the bottom E curved downward, of the drain pipe E' leading from the base of said bottom; perforated bottom D near the base of said vessel A; the inner cylindrical vessel B; the curved perforated plate F containing filter material forming a filter bottom for said inner vessel B; a spout leading from the said inner vessel above the filter bottom thereof and through the side of the outer vessel, for drawing off the filtered liquid; and a mass of filter material partly filling the annular space between said outer and inner vessels, substantially as and for the purposes described.

3. In a combined water filter and cooler, the combination with two concentric cylindrical vessels each provided with covers, of a perforated plate set across the water vessel near the base thereof, and forming a support for the base of the inner vessel, filter material placed in the annular space between said vessels and resting on the said perforated plate, a perforated ring held in said annular space above said filter material; a filter bottom at the base of said inner vessel, and clear of the bottom of the outer vessel; a drain pipe at the base of the bottom of said outer vessel, and a spout leading from the said inner vessel, above the filter bottom thereof, and through the side of the outer vessel, for drawing off the filtered water, substantially as and for the purposes described.

In testimony whereof I affix my signature in presence of two witnesses.

JOHN McCABE.

Witnesses:
ALPHONSE J. CUNEO,
ESPY W. H. WILLIAMS.